United States Patent
Cordrey

[15] 3,685,288
[45] Aug. 22, 1972

[54] REMOTE CONTROLLED POWER BRAKE

[72] Inventor: Richard N. Cordrey, Middleton, Ohio

[73] Assignee: Armco Steel Corporation, Middletown, Ohio

[22] Filed: Aug. 13, 1970

[21] Appl. No.: 63,403

[52] U.S. Cl. ............................. 60/54.5 R, 188/170
[51] Int. Cl. ........................................... F15b 7/00
[58] Field of Search ............... 60/54.5; 188/151, 170

[56] References Cited

UNITED STATES PATENTS

| | | | |
|---|---|---|---|
| 2,847,094 | 8/1958 | Abraham | 188/151 R |
| 2,525,461 | 10/1950 | Schnell | 188/170 |
| 3,324,976 | 6/1967 | Tuegel | 188/170 |

*Primary Examiner*—Martin P. Schwadron
*Assistant Examiner*—A. M. Zupcic
*Attorney*—Melville, Strasser, Foster & Hoffman

[57] ABSTRACT

Arrangement for amplifying power applied to a load member including a power system having spring means for moving a pivoted beam in one direction and a fluid system for moving the beam in the opposite direction. A lever, pivotally carried by the beam, is connected at one end to the load member. Manual control means are arranged to move the other end of the lever, which movement is effective to vary the pressure in the fluid system and thereby control movement of the pivoted lever.

11 Claims, 1 Drawing Figure

PATENTED AUG 22 1972
3,685,288
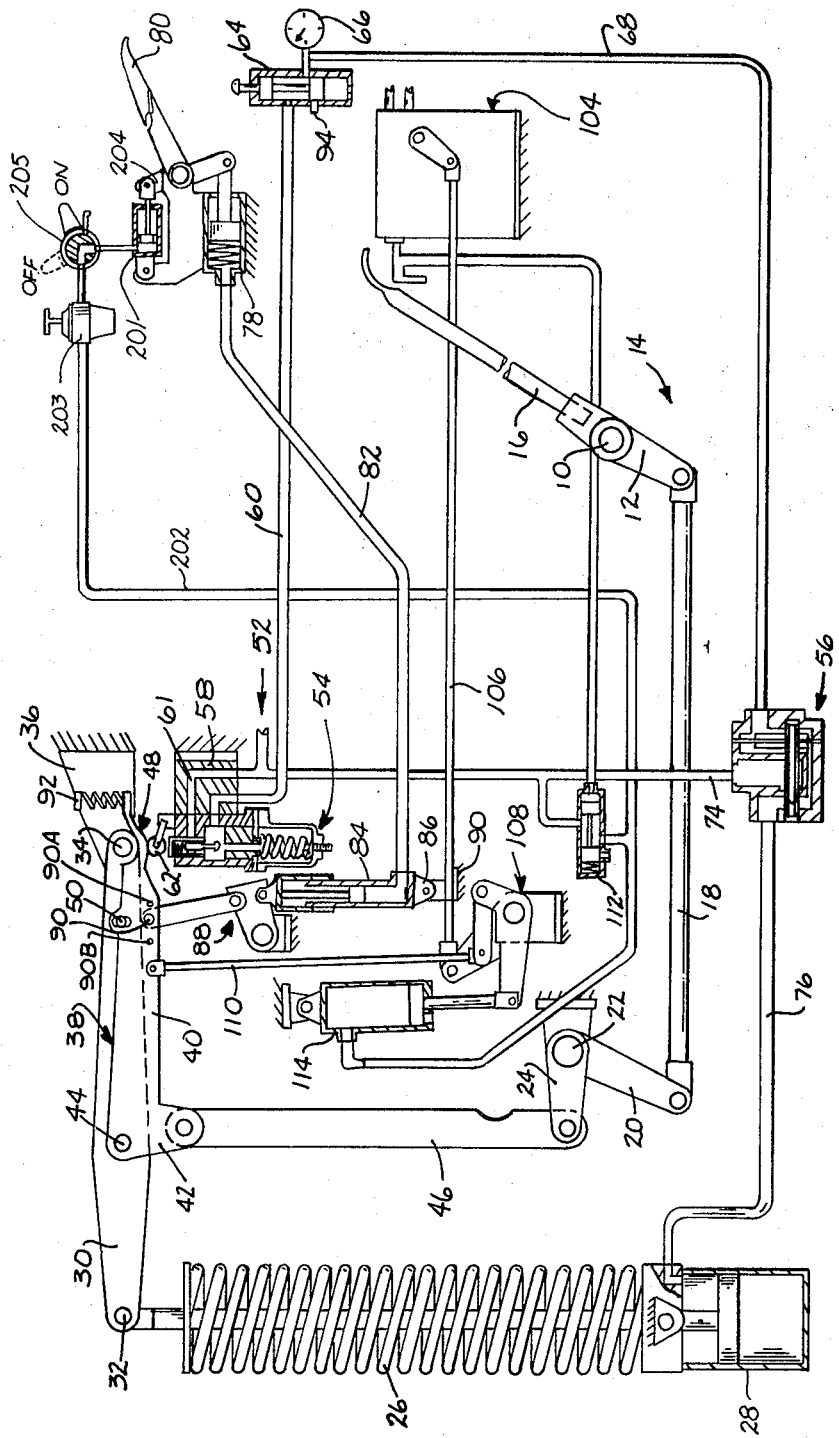
INVENTORS
RICHARD N. CORDREY
BY *Melville, Strasser, Foster and Hoffman*
ATTORNEYS

REMOTE CONTROLLED POWER BRAKE

BACKGROUND OF THE INVENTION

This invention relates to a device for amplifying the power applied by an operating means with proportional reproduction of force and motion, and specifically to an arrangement for reducing the manual effort required to operate a load member without loss of "feel" at the manual control. The invention has great and particular utility in connection with a power booster for actuating a friction brake band on drawworks and the like.

U.S. Pat. No. 2,847,094 in the name of James G. Abraham and entitled "Power Operated Brake for Drawwork" shows a power brake including several specific embodiments, all of which involve a pair of interconnected levers maintained in constant spatial relationship. In all of the embodiments of this patent, one of the levers is connected to both the power means and the load, while the other lever is moved in response to a manual control system. The power means includes a spring effective to move the lever in one direction and an opposed fluid actuating system; in one embodiment, the spring is effective to apply the brake and the opposed fluid system releases the brake, while in the other embodiment, the brake is applied by the fluid system and released by the spring.

According to this beam power means is applied to one of a pair of connected levers, while the other lever is connected to the load (a brake band in the embodiment disclosed). As will be apparent from the detailed description which follows, this arrangement results in several distinct and very important advantages. crank First of all, a substantially longer stroke is possible at the brake connecting rod. Thus, it possible to connect the power brake of this invention directly to the existing brake lever operating shaft.

Secondly, the pressure modulating valve has a fixed mounting. With such a fixed pressure modulating valve, it is not necessary to use flexible hoses required in the prior art devices which were subject to wear and damage.

Third, the arrangement of this invention can readily be connected to automatic controls (automatic drilling controls in the connection of drawworks) without modification.

SUMMARY OF THE INVENTION

This invention contemplates the provision of a power package which is arranged to be manually controlled by an operator at a remote location. The output of the power package may be connected to the drawworks brake bands by any suitable mechanism.

The power package includes a power system having spring means for applying force in one direction and a fluid system opposing the spring means. By varying pressure in the fluid system, it will be apparent that the resultant force can be effective in two directions.

The power package also includes a number of interconnected levers. The power system described above is connected to one end of a pivoted beam, and in accordance with the foregoing, by varying the pressure in the fluid system, can pivot this beam in two directions. A lever, pivotally carried by the beam, is connected at one end to the load member. The other end of this pivoted lever is arranged to be moved in response to a manual control means. This movement of the other end of the pivoted lever manually actuates a pressure control valve which is effective to control the pressure in the fluid system. As already indicated, variations in the pressure in this fluid system are effective to control movement of the pivoted beam, which is effective through the lever carried thereby to apply force to the load member.

DESCRIPTION OF THE DRAWING

The FIGURE is a schematic illustration of one embodiment of the invention.

DESCRIPTION OF THE PREFERRED EMBODIMENT

For purposes of illustration, this specification will describe the application of the power brake of this invention to the conventional drum surrounding brake band of drawworks. In FIG. 1 the existing drawworks brake lever shaft is indicated at 10. The brake will be applied by rotating the brake shaft crank 12 in the direction indicated by the arrow 14. The hand lever 16, which may be removable, is available for manual application of the brake if desired.

The power brake of this invention may be connected to the existing brake shaft crank 12 by means of the drag link 18 and crank 20. As shown in the drawing, the crank 20 is pivotally mounted on the shaft 22, and may be pivoted about the shaft by means of the crank arm 24. This linkage is exemplary only; under some conditions, the power brake of this invention can be connected directly to the drawworks brake band.

Generally considered, the power brake of this invention includes a power system, and means for applying the force generated by the power system via a plurality of interconnected levers to the crank arm 24.

According to the preferred embodiment of the invention, the power system includes a large compression spring 26 which is released or retracted by varying the pressure supplied to the single acting fluid cylinder 28. That is, the compression force of the spring acts in a direction to apply the brake; therefore, increasing the fluid pressure in the cylinder 28 will be effective to release the brake, while decreasing the fluid pressure allows increasing spring force or thrust. The details of the fluid system will be described presently.

The resultant force of the power system just described will be applied to one end of the pivoted beam 30 by means of the pinned connection 32. The opposite end of the beam 30 will be pivotally secured as at 34 to a rigid portion of the housing indicated schematically at 36.

The lever indicated generally at 38 is pivotally carried by the beam 30. The lever 38 includes the long 40 and the short arm 42, and may be pivotally mounted as about the pin 44. The sort arm 42 of the lever 38 is connected by means of the connecting rod 46 to the crank arm 24.

The free end of the long arm 40 includes an arcuate cam portion 48 which extends between the pivot point 34 and a pressure modulating valve 54 to be described later. It will be observed that the arcuate cam portion 48 is curved to a radius about the point 34. Therefore, rotation about the pin 34 by the beam 30 and arm 40 together will not affect the pressure modulating valve 54. As will be explained hereinafter, the pressure modulating valve 54 will be actuated only by movement of the arm 40 about its pivot pin 44 (i.e., movement of the arm 40 relative to the beam 30 and its pivot point 34). The pin and slot connection 50 between the beam 30 and the long arm 40 limits and controls relative movement between the portion 48 of the arm 40 and the pivot point 34.

The fluid system which opposes the compression force of the spring 26 includes a supply of fluid under pressure (not shown) which will be connected to the conduit at 52, a mechanically actuated pressure control valve indicated schematically at 54, and will preferably include a volume booster relay valve indicated generally at 56.

It should be understood that the mechanically actuated three way pressure modulating valve 54 does not per se form a part of this invention. For present purposes, the valve 54 will be fixedly secured to a portion of the frame or housing indicated schematically at 58. The axis of the valve 54 should lie on a radius from the point 34, and will preferably be oriented approximately normal to the position of the beam 30 at the midpoint of its total arcuate travel. The valve 54 will be supplied with fluid under pressure from the supply 52 via the port 61, and the outlet from the valve 54 is connected to the line 60. The pressure of fluid in the outlet 60 will vary with the position of the cam roller 62. As the cam roller 62 is moved downwardly (when viewed as in the accompanying drawings) it will be effective via the internal mechanism of the valve to increase the pressure flowing from the valve via the line 60. A commercial valve fully suitable for the practice of this invention is sold by Westinghouse Airbrake Company under the designation H-3 Controlair (r) Valve, and described in detail in Wabco Controlair Valve Catalogue Sheet No. B4-65.15.

The output line 60 described above is connected via the emergency and parking valve 64, gauge 66, and line 68, to the volume booster relay valve indicated generally at 56.

Again, the valve 56 does not per se form a part of this invention. It may generally be described as a pilot operated, pressure controlled volume booster. Input to the valve is via the line 74 which is connected to the supply 52, and the output 76 is connected to the single acting fluid cylinder 28. The valve 56 receives a pressure signal from the pressure control valve 54 via the line 68, and is effective to repeat this pressure with a greater rate of flow from the line 74 to the cylinder 28 by means of the line 76. A commercially available valve suitable for the practice of this invention is available from Westinghouse Airbrake Company under the designation S Relay Valve, described in detail in Wabco S relay Valve Catalogue Sheet No. A5-80.07.

The manual control for the power brake of this invention will be suitable mounted at the control stand which may be remotely located, and includes the hydraulic control cylinder 78 and manual operating lever 80. The cylinder 78 is connected via the hydraulic line 82 to the hydraulic actuator 84. This actuator is secured as at 86 to a portion of the frame indicated schematically at 90. The free end of the hydraulic actuator 84 is connected to the actuating linkage 88 which is in turn connected as at 90 to the long arm 40 of the lever 38. The long arm 40 will preferably be provided with alternate connecting points 90A and 90B, permitting adjustment of the effective length of the arm 40. As will become apparent hereinafter, this will vary the manual effort required to operate the brake.

To facilitate a full understanding of the invention, the operation of the components thus far described will now be explained. In order to apply the brake, the operator depresses the lever 80, rotating it in a clockwise direction. This actuates the hydraulic control cylinder 78 and in turn the hydraulic actuator 84, which via the linkage 88 pivots the long arm 40 of the lever 38 relative to the pivotal beam 30 in a counterclockwise direction. This raises the cam portion 48 of the long arm, allowing the roller cam 62 to move upwardly, thereby decreasing the fluid pressure in the output line 60. This reduced pressure is transmitted via the valve 56 through the line 76 to the cylinder 28. As explained earlier, reduced pressure in the cylinder 28 permits the spring 26 to expand, forcing the left-hand end of the pivotal beam 30 upwardly. As the beam 30 moves upwardly, this motion is transmitted via the short arm 42 of the lever 38 to the connecting rod 46, tending to move the crank arms 24 and 20 in a clockwise direction, thereby moving the drag link 18 to the left as seen in the FIGURE, and rotating the brake shaft crank 12 in the direction of the arrow 14 to apply the brake.

It will be observed that included angle between the arms 40 and 42 of the lever 38 is less than 90°. Thus, when the brake bands begin to engage, the slight resistance toward further rotation of the brake shaft crank 12 will be effective through the linkage described above to tend (in response to further upward movement of the beam 30) to pivot the arm 40 in a clockwise direction. This tends to force the actuating link 88 and hydraulic actuator 84 downwardly and is thus felt as resistance to additional movement of the manual lever 80. This clockwise movement of the arm 40 also tends to depress cam roller 62 to increase the pressure flowing from valve 54 and prevent additional braking action unless opposed by additional force applied to the hand lever 80 which will, as described above, serve to further reduce pressure delivery from the positioning valve 54 to the cylinder 28. The output of the spring 26 of course increases with the air pressure drop, and is felt as an increasing force required to hold the hand lever 80 in position.

As briefly mentioned earlier, the effective length of the arm 40 can be varied by connecting the linkage 88 to the arm 40 at 90, 90A or 90B. Using the point 90A will lengthen the arm and give a "softer feel," while the point 90B will shorten the arm and give a "stiffer feel."

The net result of the mechanism characteristics is that braking effort is proportional to the force applied to the hand lever 80. With no force on the lever, the spring 92 will be effective to force the long arm 40 of the lever 38 downwardly, moving the roller cam 62 downwardly, and increasing the pressure to the cylinder 28 to retract the spring 26 and return the brake bands and hand lever 80 to the fully released position.

It should be apparent that the above described system provides an inherent "fail-safe" feature. Any loss of fluid pressure will cause the brake to be automatically applied. The emergency and parking valve 64 briefly mentioned earlier is effective when moved to the down position to close the line 60, and vent the line 68 to atmosphere via the port 94.

The invention may also be readily coupled to an automatic drilling control unit such as indicated schematically at 104. The output of this unit is effective via the rod 106 and crank mechanism indicated generally at 108 to move the vertical rod 110, thereby actuating the power brake of this invention in the manner described above. That is, vertical movement of the rod 10 will pivot the lever 38, thereby moving the roller cam 62 and varying the pressure in the fluid system so as to apply or release the brake.

When such automatic equipment is used, it is necessary to provide the pilot valve 112 and lock-out cylinder 114. When the automatic system is turned off, fluid in the line 74 will pass into the lock-out cylinder 114 disengaging the linkage 108 to avoid interference with manual operation. On the other hand, energization of the automatic drilling control will shift the pilot valve 112 to a position exhausting fluid from the cylinder 114. The system will then operate in response to the automatic drilling control unit 104.

It will be apparent to the skilled worker in the art that by virtue of the spring in the control cylinder 78, the power brake of this invention would be self-releasing. That is, if the manual force on the hand lever 80 were removed, the brake bands would return to the fully released position. Under certain circumstances, this self-releasing characteristic could be undesirable. For example, an operator may wish to hold a light load on the brakes, such as an "empty block" load in oil well drilling rigs, and momentarily leave the hand lever unattended. This may be readily accomplished by adding to the control stand a counterbalancing feature. As shown in FIG. 1, this includes a counterbalance air cylinder 201 which receives a supply of air under pressure via conduit 202. The conduit 202 may conveniently be connected to the supply port 52, although such connection is not shown in the drawings. A relieving type dial controlled pressure regulator 203 is used to set up the desired cylinder thrust which will be applied to crank 204 attached to the hand lever. A manually operated three-way valve 205 is provided so that the counterbalancing feature may be selectively engaged or disengaged. The pressure regulator 203 can be adjusted for a broad range of delivery pressures so that the effective moment of the counterbalancing cylinder force on the hand lever crank 204 can be made to exactly balance the self-releasing tendency of the brake mechanism, or can be increased so that very light to heavy loads can be held with the brake without need of a manual effort being applied to the hand lever. At all times, the braking effort can be increased or decreased by manually pressing down or lifting up on the hand lever, even though the counterbalancing feature is activated.

When the power brake of this invention is used on equipment not having automatic weight controls, this counterbalancing feature just described can be adjusted so as to allow the brake to slip, or "feed off."

It will also be observed that the line 202 is connected to the line between the pilot valve 112 and cylinder 114, so that the counter balancing cylinder air supply will be automatically cut off when the automatic control 114 shifts the pilot 112 to 104 exhaust position.

It is believed that the foregoing contemplates a full and complete disclosure of the invention. No limitations are intended except as specifically set forth in the claims which follow.

The embodiments of the invention in which an exclusive property or privilege is claimed are defined as follows:

1. A remote controlled power amplifying unit comprising:
  a. a pivotally mounted beam;
  b. a lever pivotally carried by said beam;
  c. means for connecting one end of said lever to a load;
  d. actuated means for moving the other end of said lever;
  e. pressure modulating valve means responsive to movement of said other end of said lever; and
  f. a power system connected to one end of said pivotally mounted beam, said power system having:
    i. spring means for moving said beam in one direction, and
    ii. a fluid system including said pressure modulating valve means opposing said spring means, whereby variations in pressure in said fluid system are effective to move said pivotally mounted beam in opposite directions, movement of said beam in one direction being effective via said lever to apply a force to said load.

2. The power amplifying unit claimed in claim 1, wherein said pressure modulating valve is mechanically actuated.

3. The power amplifying unit claimed in claim 1 including a volume booster relay valve responsive to said pressure modulating valve.

4. The power amplifying unit claimed in claim 1 wherein said lever includes a long arm and a short arm, said means for connecting one end of said lever to a load being associated with said short arm, said long arm having a portion extending between said pressure modulating valve and the pivot point for said beam.

5. The power amplifying unit claimed in claim 4 wherein said actuated means is operatively connected to said long arm of said lever.

6. The power amplifying unit claimed in claim 4 including spring means normally biasing said long arm.

7. The power amplifying unit claimed in claim 4 wherein said actuated means includes a manual control and an extendable hydraulic system responsive to said manual control, said extendable hydraulic system being connected to said long arm of said lever.

8. The power amplifying unit claimed in claim 1 including emergency valve means for exhausting the pressure in said fluid system.

9. The power amplifying unit claimed in claim 1 wherein said lever includes a long arm and a short arm, said actuated means being operatively connected to said long arm and said means for connecting said lever to a load being associated with said short arm, said arms being annularly related whereby movement of said beam in said one direction to apply a force to said load tends to bias said lever in a direction opposed to the force applied by said manually actuated means.

10. The power amplifying unit claimed in claim 1 wherein said lever includes a long arm and a short arm, the included angle between said long arm and said short arm being less than 90°.

11. A remote controlled power brake comprising:
a. a power system including:
   i. spring means for applying a force in one direction;
   ii. a fluid system opposing said spring means, and
   iii. means for varying the pressure in said fluid system whereby to selectively apply and remove said force;
b. actuated means, said means for varying the pressure in said fluid system being operatively associated with and responsive to said actuated member; and
c. means for applying said force to a load with proportional reproduction of force and motion, said means including a pivotally mounted beam for receiving said force from said power system, and a lever pivotally carried by said beam, one end of said lever being operatively connected to said load.

* * * * *